United States Patent [19]
Perkins

[11] 3,986,652
[45] Oct. 19, 1976

[54] FEEDING APPARATUS
[75] Inventor: William Dale Perkins, Downers Grove, Ill.
[73] Assignee: The Corey Steel Company, Cicero, Ill.
[22] Filed: Aug. 12, 1974
[21] Appl. No.: 496,904

[52] U.S. Cl. .................................. 226/181; 226/189
[51] Int. Cl.² ......................................... B65H 17/22
[58] Field of Search ........... 226/189, 181, 184, 186, 226/187, 196, 197

[56] References Cited
UNITED STATES PATENTS

| | | | |
|---|---|---|---|
| 1,224,046 | 4/1917 | Turley | 226/184 X |
| 1,933,073 | 10/1933 | Rich | 226/196 X |
| 2,347,639 | 4/1944 | Platt | 226/187 X |
| 2,512,335 | 6/1950 | Kholos | 226/196 X |
| 2,850,998 | 9/1958 | Williams | 226/184 X |
| 3,279,669 | 10/1966 | Bernard | 226/181 |
| 3,589,580 | 6/1971 | Smulders | 226/187 X |
| 3,627,187 | 12/1971 | Hartkoph | 226/181 X |
| 3,715,068 | 2/1973 | Clarke | 226/187 X |

*Primary Examiner*—Richard A. Schacher
*Attorney, Agent, or Firm*—LeBlanc & Shur

[57] ABSTRACT

Disclosed is a support structure mounting groups of rollers with each group having a first pair of rollers spaced one from the other for rotation about parallel axes and a second pair of rollers spaced one from the other for rotation about parallel axes generally normal to the first mentioned parallel axes. The opposed rollers of each pair thereof in each group in part define and lie on opposite sides of the path movement of unstraightened bar stock being fed to a straightening machine. The spacing between the opposed rollers is substantially greater than the diameter of the bar stock passing through the feed mechanism. A motor and chain drive is coupled to the groups of rollers such that a pair of rollers of each group and one other roller in each group are driven thereby to advance the unstraightened bars through the feed mechanism. The rollers carry resilient material about their peripheries whereby the noise level generated by the whipping or flailing action of the unstraightened bars against the rollers of the feed mechanism is substantially reduced.

5 Claims, 3 Drawing Figures

FEEDING APPARATUS

The present invention relates to a feed mechanism and particularly relates to apparatus for feeding bent bars into a straightening machine in a manner to confine the whipping and flailing action normally attendant thereto and to reduce the noise levels generated by such whipping and flailing action.

One of the most important operations in a cold drawn mill is that of straightening bars. The straightening process conventionally involves turning or spinning each unstraightened bar along its central axis at high speed between fixed rolls. Because the bar spins in such conventional straightener at high speed, the free end of the initially crooked or unstraightened bar tends to flail and whip about violently as it is being fed into the straightening machine. Because of the hazards to personnel adjacent the feed of the straightener due to such flailing and whipping action, it is customary practice to restrain the free ends of the unstraightened bars during feeding. This has, in the past, been accomplished by providing a generally tubular steel feeding device. While such hazards are essentially eliminated or minimized by feeding devices of such type, the rotary action of the straightener causes the free ends of the bars to strike the surrounding confining structure and this generates a loud high frequency noise. Frequently the noise level during such straightening operations reaches 115 decibels. This noise level or pollution most often exceeds maximum permissible standards and can be injurious to workmen operating these and other adjacent machines.

The present invention provides a feed mechanism which minimizes or eliminates the foregoing or other problems associated with prior feed mechanisms for straightening and other machines and provides a novel and improved feed mechanism, particularly for straightening bars in cold drawn mill operations, having various advantages in construction, use and result in comparison with prior feed mechanism. Particularly, the present invention provides a mechanism for feeding the bars into the standard straightener, restraining the unstraightened bars from flailing and whipping action as they are fed into a standard straightener and reducing the noise level generated by the flailing and whipping action to an acceptable level. To accomplish this, the present invention provides a feed mechanism which utilizes idler and driven rollers to define the path of feed of the bars into the straightener, to confine the bars to that feed path, to drive the bars into the straightener and to reduce the level of noise upon engagement of the bars being fed and the rollers. More particularly, the present invention provides a plurality of groups of rollers disposed at longitudinally spaced positions along an elongated support structure. Each group of rollers comprises a first pair of rollers in spaced relation on opposite sides of and in part defining the path of travel of the bar and mounted for rotation about generally parallel axes. A second pair of spaced rollers in spaced relation on opposite sides of an in part defining the path of travel of the bar are mounted for rotation about generally parallel axes normal to the first-mentioned axes. The rollers are provided with resilient, preferably rubber, peripheries. A chain drive driven by a suitable motor is connected to various sprockets coupled to the lower and side rollers of each group thereof for driving the same and feeding the unstraightened bars to the straightener.

In use, the unstraightened bars are fed between the pairs of rolls of each group of rolls in a longitudinal direction and into a conventional straightener. The flailing or whipping action of the free ends of the bars when the straightener spins the bars is restrained by and confined between the pairs of rollers of each group. The pairs of rollers of each group effectively circumferentially confine the bars to limited transverse and vertical movement. The power-driven rollers also serve to feed the bars forwardly into the straightener. The resilient, preferably rubber, peripheries of the rollers substantially reduce the level of noise generated by engagement of the bars and rollers when the bars flail about in comparison with the noise level produced by engagement of the flailing bars with the standard steel feed mechanisms.

Accordingly, it is a primary object of the present invention to provide a novel and improved feeding apparatus.

It is another object of the present invention to provide a novel and improved apparatus for feeding unstraightened bars into a straightener whereby the bars while feeding are restrained and confined from substantial flailing action.

It is still another object of the present invention to provide a novel and improved feed mechanism for feeding bars into a straightener wherein the noise level incident to engagement of the free ends of flailing unstraightened bars with elements of the feeding mechanism is minimized.

It is a further object of the present invention to provide a feed mechanism having the foregoing characteristics and wherein such mechanism is readily and inexpensively constructed of known and available conventional materials and which can be readily adapted for use with a standard straightener and other machines.

These and further objects and advantages of the present invention will become more apparent upon reference to the following specification, appended claims and drawings wherein:

Figure 1:
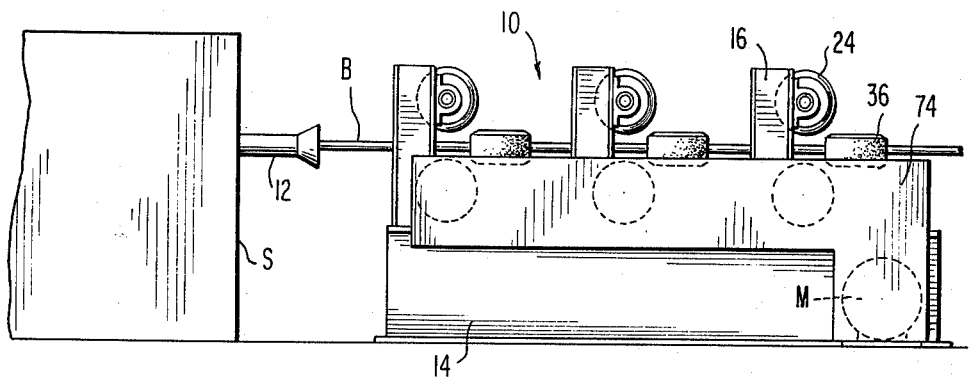
FIG. 1 is a side elevational view of a feed mechanism constructed in accordance with the present invention and illustrated in position for feeding unstraightened bars into a straightening machine.

Referring now to the drawings, particularly to FIG. 1, there is illustrated a feed mechanism, generally designated 10, constructed in accordance with the present invention for feeding unstraightened bars B into a straightener designated S. The straightener is conventional and of a type which spins unstraightened bars along a central axis between fixed rolls. Since the straightener per se forms no part of the present invention, further description thereof is believed unnecessary except to designate the inlet feed tube of the straightener as 12. As illustrated, the feed mechanism 10 is disposed to feed bars B into the inlet tube 12 of straightener S and it will be appreciated from the foregoing generalized description that as a result of the spinning action imparted bars B by the straightener, the free end portion of the bar B extending within the feed mechanism will whip and flail about. The present straightener 10 restrains such flailing action, confines the unstraightened bar in a limited area along the path of travel of the bar toward the straightener, feeds the bar to the straightener and reduces the noise level incident to the engagement of the bar and the feed mechanism during feeding and straightening operations.

Figure 2:
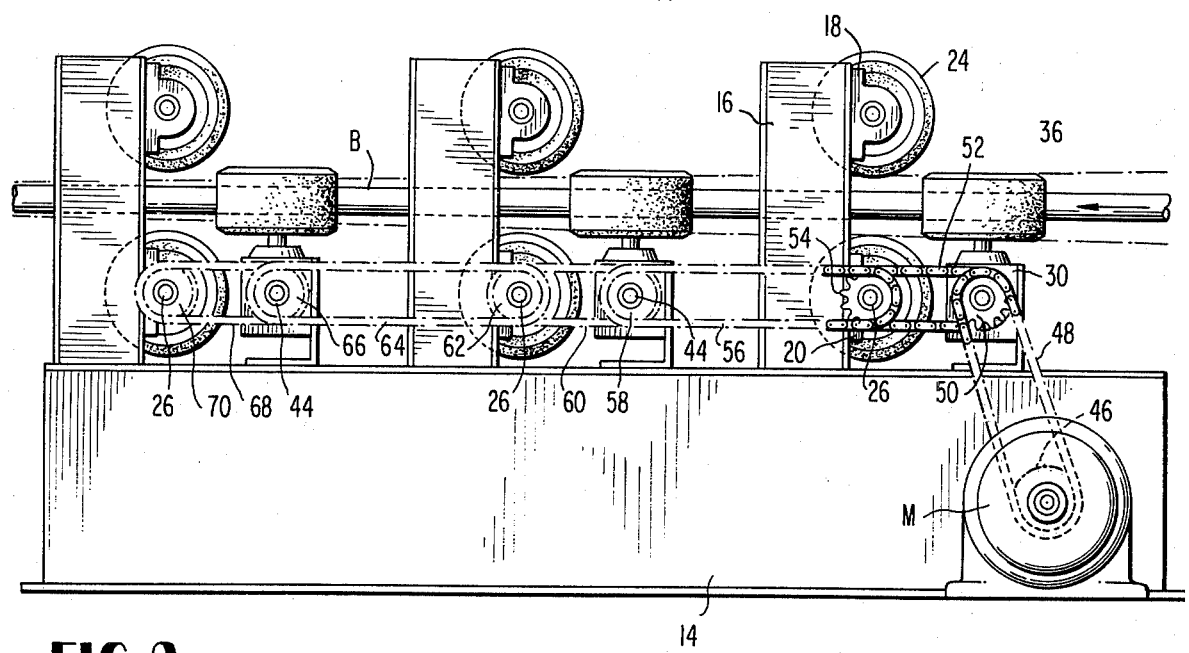
FIG. 2 is an enlarged side elevational view of the feed mechanism hereof.
Figure 3:
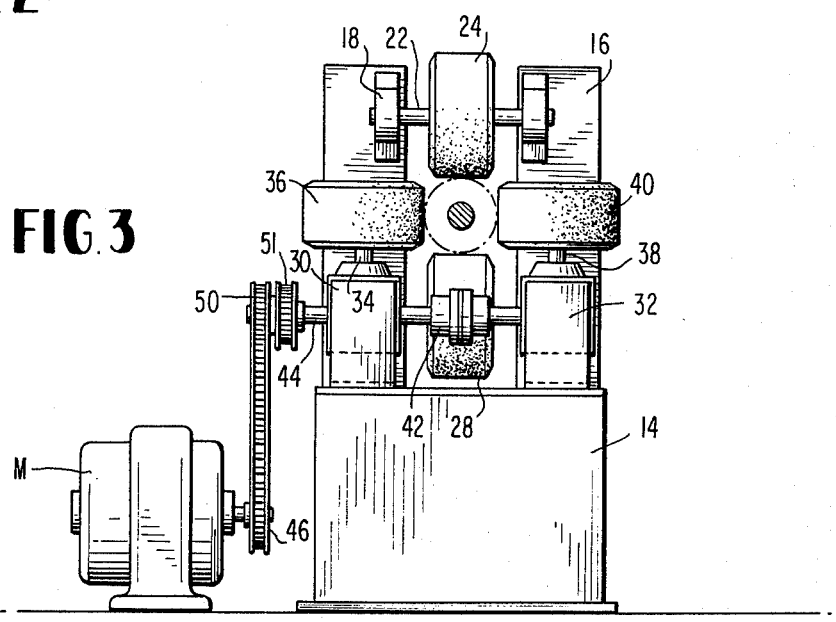
FIG. 3 is an end elevational view thereof looking from right to left in FIG. 2.

More particularly, feed mechanism 10 includes a base support structure 14 of any conventional type construction, the details of which are not significant in the present invention. Supported by base structure 14 are plural pairs of uprights 16, which in the preferred form constitute short beams. Uprights 16 are disposed on base support structure 14 at longitudinally spaced positions along feed mechanisms 10. The uprights of each pair thereof are laterally spaced one from the other and lie along opposite sides of support structure 14. Secured along one side of each upright 16 are vertically spaced housings 18 and 20. As best illustrated in FIG. 3, the upper housings 18 of each transversely spaced pair of uprights 16 journal a shaft 22 on which is mounted an idler roller 24. The housings 20 of each transverse pair of uprights 16 also journal the ends of a shaft 26 on which is mounted a roller 28. From a review of FIGS. 2 and 3, it will be appreciated that the rollers 24 and 28 are spaced vertically one from the other and are mounted for rotation about substantially generally horizontal axes. The upper roller 24 is freewheeling and consitutes an idler roller while the lower roller 28 is driven in a manner to be set forth in the ensuing description.

Carried on the base structure 14 and in front of each pair of uprights 16 is a pair of gear boxes 30 and 32 disposed along respective opposite sides of structure 14. Each gear box 30 mounts a shaft 34 which carries a roller 36. Each gear box 32 carries an upstanding shaft 38 which carries roller 40. From a review of FIGS. 2 and 3 it will be appreciated that the rollers 36 and 40 are spaced laterally one from the other, lie at a like elevation relative to one another, and are carried by structure 14 for rotation about generally parallel axes generally normal to the axes of wheels 24 and 28. The gear boxes 30 and 32 are connected by stub shafts carrying a coupling 42. The gear boxes 30 and 32 are of the type whereby a rotary input to stub shaft 44 coupled to gear box 30 produces rotation of wheels 36 and 40 in opposite directions and in a direction wherein a bar between the rollers in contact with either roller would be advanced forwardly toward straightener S.

To provide a drive for the feed mechanism and rotate the laterally spaced rollers 36 and 40 as well as the lower roller 28 of each group of rollers, there is provided a drive motor designated M having a drive sprocket 46. A chain drive 48 connects the drive sprocket 46 with a sprocket 50 carried on the end of stub shaft 44. Shaft 44 also carries an inner sprocket 51 connected by a drive chain 52 to similar inner sprocket, not shown, on shaft 26. The outer end of shaft 26 carries a sprocket 54 which is drivingly coupled by a chain 56 to the outer sprocket 58 on stub shaft 44 on the next group of rollers. Stub shaft 44 in the intermediate group of rollers carries an inner sprocket, not shown, which is drivingly coupled by a chain 60 to the inner sprocket, not shown, on a shaft 26. Also carried on the end of shaft 26 is an outer sprocket 62 drivingly coupled by a chain 64 to the outer sprocket 66 carried on the stub shaft 44 of the group of rollers immediately preceding the straightener. The end of this stub shaft 44 carries an inner sprocket, not shown, which is drivingly coupled by a chain 68 to a sprocket 70 carried on shaft 26. Consequently, it will be appreciated that by rotation of drive sprocket 46, the laterally spaced rollers 36 and 40 of each group of rollers are rotated in opposite directions while the lower rollers 28 of the vertically spaced rollers in each group thereof are rotated in a counterclockwise direction as seen in FIG. 2, all such rollers, idler rollers 24 excepted, being rotated in a direction tending to advance the bar located between the vertically and horizontally spaced roller pairs in a direction toward the straightener. A guard 74 may be provided along each side of the feed mechanism 10 as illustrated in FIG. 1.

From the foregoing description, it will be appreciated that each group of rollers comprises a first pair thereof laterally spaced one from the other for rotation about generally parallel vertically extending axes and a second pair of rollers vertically spaced one from the other and mounted for rotation about spaced generally horizontally extending axes substantially normal to the first mentioned axes. Also, from a review of FIG. 3, it will be appreciated that the space between the laterally and vertically opposite rollers constitutes a path for moving the bar B along the feed mechanism toward the straightener. The rollers of each pair thereof are also spaced one from the other a distance substantially greater than the largest transverse dimension of the bars being fed through the feed mechanism toward the straightener. That is, the pairs of rollers are spaced one from the other a distance preferably at least twice as great as the diameter of the bar being fed through the feed mechanism to enable the bar to limitedly flail within the peripheral confines defined by the opposed rollers in each group thereof. A significant feature of the present invention resides in providing resilient material about the peripheral surfaces of the rollers 24 and 28, 36 and 40 in contact with the bars. Preferably, the rollers consitute small rubber tires.

In operation, an unstraightened bar B is inserted along the path through the feed mechanism 10 defined between the opposed pairs of rollers of each group thereof with the leading end of the unstraightened bar B being inserted into the inlet 12 of the straightener. When the straightener is in operation, the bar is rotated at a high rate of speed and it will be appreciated that the free end of the unstraightened bar in the feed mechanism will deviate from axial symmetry along its path of movement between the opposed rollers and will attempt to flail and whip about. The opposed rollers, however, define confined spaces for the bar which permits limited flailing and whipping action thereof but confines the bar within predetermined limits. It will be appreciated that the bar, when in contact with the lower drive rollers 28 and the side rollers 36 and 40 of each group of rollers, will be driven forwardly in a direction toward the straightener S. It will also be appreciated that the resilient surfaces of the rollers significantly reduce the noise level generated by the feed machine upon engagement of the bar and feed rollers. Consequently, the feed mechanism hereof feeds the bars forwardly toward the straightener, confines the flailing and whipping action within limited transverse and vertical distances and significantly reduces the noise level produced by engagement of the bars and feed rolls.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for feeding bars along a predetermined path into a straightener, restraining the bars from flailing and whipping action and reducing the noise level generated by said flailing and whipping action comprising a support structure, a first pair of rollers carried by said support structure in spaced relation one to the other and for rotation about a pair of spaced generally parallel axes, the rollers of said first pair thereof in part defining and lying on opposite sides of the path of movement of each bar as it is fed into the straightener, a second pair of rollers carried by said support structure in spaced relation one to the other and for rotation about a pair of second generally parallel axes substantially normal to said first pair of axes, the rollers of said second pair thereof in part defining and lying on opposite sides of the path of movement of each bar as it is fed into the straightener whereby said first and second pairs of rollers substantially circumferentially confine each bar when moved along said path, the spacing between the rollers of said first pair thereof and the spacing between the rollers of the second pair thereof being such that the distance between the opposed rollers is substantially greater than the largest transverse dimension of the bar movable along said path whereby when one roller or a pair of opposed rollers is engaged by the bar the opposite roller thereof is spaced from the bar, means carried by said support structure for moving the bar along said path, said means including means for driving at least one roller of said first and second pairs of rollers, and means carried by said rollers and engagable with the bar movable along said path for reducing the noise level produced by engagement of the bar and said rollers.

2. Apparatus according to claim 1 including means for driving at least two rollers of said first and second pairs thereof for moving each bar along said path.

3. Apparatus according to claim 1 wherein said drive means includes means for driving at least one of said rollers of said first and second pairs thereof in each said group.

4. Apparatus according to claim 3 wherein said drive means includes means for driving another roller of said first and second pairs thereof in each group of rollers, one of the driven rollers constituting one of said first pair of rollers and the other of said driven rollers constituting one of the second pair of rollers.

5. Apparatus according to claim 1 wherein said first and second pairs of rollers are mounted for rotation in horizontal and vertical planes respectively, and means for simultaneously driving the first pair of rollers and the lowermost roller of said second pair thereof, the uppermost roller of said second pair thereof constituting an idler roller.

* * * * *